United States Patent
Kiefer et al.

(10) Patent No.: US 7,332,530 B2
(45) Date of Patent: Feb. 19, 2008

(54) PROTON-CONDUCTING POLYMER MEMBRANE COMPRISING A POLYMER WITH SULPHONIC ACID GROUPS AND USE THEREOF IN FUEL CELLS

(75) Inventors: Joachim Kiefer, Losheim am See (DE); Oemer Uensal, Mainz (DE); Gordon Calundann, North Plainfield, NJ (US)

(73) Assignee: Celanese Ventures GmbH, Frankfurt am Main (DE)

( * ) Notice: Subject to any disclaimer, the term of this patent is extended or adjusted under 35 U.S.C. 154(b) by 0 days.

(21) Appl. No.: 10/523,373

(22) PCT Filed: Jul. 31, 2003

(86) PCT No.: PCT/EP03/08462

§ 371 (c)(1),
(2), (4) Date: Mar. 23, 2005

(87) PCT Pub. No.: WO2004/015803

PCT Pub. Date: Feb. 19, 2004

(65) Prior Publication Data

US 2005/0244695 A1   Nov. 3, 2005

(30) Foreign Application Priority Data

Aug. 2, 2002 (DE) ............... 102 35 356
Aug. 2, 2002 (DE) ............... 102 35 357

(51) Int. Cl.
*C08J 5/22* (2006.01)
*H01M 8/10* (2006.01)

(52) U.S. Cl. ............. 521/27; 521/30; 429/30; 429/33; 526/286

(58) Field of Classification Search .......... 521/27, 521/30; 429/33, 30; 526/286
See application file for complete search history.

(56) References Cited

U.S. PATENT DOCUMENTS

| | | | |
|---|---|---|---|
| 3,224,908 A | 12/1965 | Duch et al. | |
| 3,293,088 A | 12/1966 | Herbst et al. | |
| 3,313,783 A * | 4/1967 | Yoshio et al. | 528/336 |
| 3,737,045 A | 6/1973 | Hasimoto et al. | |
| 3,783,137 A * | 1/1974 | Gerber | 528/208 |
| 3,808,305 A | 4/1974 | Gregor | |
| 4,012,303 A | 3/1977 | D'Agostino et al. | |
| 4,075,093 A * | 2/1978 | Walch et al. | 210/639 |
| 4,187,333 A | 2/1980 | Rembaum et al. | |
| 4,537,668 A | 8/1985 | Gaussens et al. | |
| 4,622,276 A | 11/1986 | Walsh | |
| 4,634,530 A | 1/1987 | Kuder et al. | |
| 5,098,985 A | 3/1992 | Harris et al. | |
| 5,211,984 A | 5/1993 | Wilson | |
| 5,218,076 A | 6/1993 | Madison et al. | |
| 5,312,895 A | 5/1994 | Dang et al. | |
| 5,492,996 A | 2/1996 | Dang et al. | |
| 5,525,436 A * | 6/1996 | Savinell et al. | 429/30 |
| 5,599,639 A | 2/1997 | Sansone et al. | |
| 5,633,337 A | 5/1997 | Tan et al. | |
| 5,643,968 A | 7/1997 | Andreola et al. | |
| 5,656,386 A | 8/1997 | Scherer et al. | |
| 5,674,969 A | 10/1997 | Sikkema et al. | |
| 6,030,718 A | 2/2000 | Fuglevand et al. | |
| 6,087,032 A | 7/2000 | Yoshitake et al. | |
| 6,096,369 A | 8/2000 | Anders et al. | |
| 6,110,616 A | 8/2000 | Sheikh-Ali et al. | |
| 6,197,147 B1 | 3/2001 | Bönsel et al. | |
| 6,248,469 B1 | 6/2001 | Formato et al. | |
| 6,368,587 B1 | 4/2002 | Anders et al. | |
| 6,607,856 B2 * | 8/2003 | Suzuki et al. | 429/30 |

(Continued)

FOREIGN PATENT DOCUMENTS

DE      1 301 578      8/1969

(Continued)

OTHER PUBLICATIONS

Osaheni, J.A. and Jenekhe, S.A., "Synethesis of Processing of Heterocyclic Polymers as Electronic, Optoelectronic, and Nonlinear Optical Materials. 4. New Conjugated Rigid-Rod Poly(benzobis(imidazole))s," *Macomolecules* 28:1172-1179 (1995).

(Continued)

*Primary Examiner*—Randy Gulakowski
*Assistant Examiner*—M. Bernshteyn
(74) *Attorney, Agent, or Firm*—Hamilton, Brook, Smith, Reynolds, P.C.

(57) ABSTRACT

The present invention relates to a proton-conducting polymer membrane comprising polymers containing sulfonic acid groups, obtainable by a process comprising the steps of
A) mixing vinyl-containing sulfonic acid with one or more aromatic tetraamino compounds with one or more aromatic carboxylic acids, their esters, their acid halides or their acid anhydrides, containing at least two acid groups per carboxylic acid monomer, and/or
mixing vinyl-containing sulfonic acid with one or more aromatic and/or heteroaromatic diaminocarboxylic acids, their esters, their acid halides or their acid anhydrides,
B) heating the mixture obtainable according to step A) under inert gas to temperatures of up to 350° C., to form polyazole polymers,
C) applying a layer to a support, using the mixture according to step A) and/or B),
D) polymerizing the vinyl-containing sulfonic acid present in the sheetlike structure obtainable according to step C).

28 Claims, No Drawings

U.S. PATENT DOCUMENTS

| | | | |
|---|---|---|---|
| 6,803,139 B2 * | 10/2004 | Saito et al. | 429/32 |
| 2001/0038937 A1 | 11/2001 | Suzuki et al. | |
| 2002/0045085 A1 | 4/2002 | Formato et al. | |
| 2004/0062969 A1 * | 4/2004 | Sakaguchi et al. | 429/33 |
| 2004/0101731 A1 | 5/2004 | Jakoby et al. | |
| 2004/0186189 A1 * | 9/2004 | Muller et al. | 521/27 |
| 2004/0191602 A1 * | 9/2004 | Ishikawa et al. | 429/33 |
| 2005/0244694 A1 * | 11/2005 | Kiefer et al. | 429/33 |
| 2005/0244695 A1 * | 11/2005 | Kiefer et al. | 429/33 |

FOREIGN PATENT DOCUMENTS

| | | |
|---|---|---|
| DE | 196 53 484 A 1 | 6/1998 |
| DE | 101 48 131 A1 | 5/2003 |
| EP | 0 265 921 A2 | 5/1988 |
| EP | 0 265 921 A3 | 5/1988 |
| EP | 0 476 560 A1 | 3/1992 |
| EP | 0 846 733 A2 | 6/1998 |
| EP | 0 893 165 A2 | 1/1999 |
| EP | 1 110 992 A1 | 6/2001 |
| EP | 1 202 365 A1 | 5/2002 |
| EP | 1354907 A1 * | 10/2003 |
| JP | 53-97988 | 8/1978 |
| JP | 2002146014 | 5/2002 |
| JP | 2003022709 | 1/2003 |
| WO | WO 94/25506 | 11/1994 |
| WO | WO 99/10165 | 3/1999 |
| WO | WO 00/49069 | 8/2000 |
| WO | WO 00/54351 | 9/2000 |
| WO | WO 01/45192 A1 | 6/2001 |
| WO | WO 01/94450 A2 | 12/2001 |
| WO | WO 02/36249 A1 | 5/2002 |
| WO | WO 02/38650 A1 | 5/2002 |
| WO | WO 0238650 B1 * | 5/2002 |
| WO | WO 02/071518 A1 | 9/2002 |
| WO | WO 02/081547 A1 | 10/2002 |
| WO | WO 02/088219 A1 | 11/2002 |
| WO | WO 02/102881 A1 | 12/2002 |
| WO | WO 03/007411 A2 | 1/2003 |
| WO | WO 03/022412 A2 | 3/2003 |
| WO | WO 03/022412 A3 | 3/2003 |

OTHER PUBLICATIONS

Y. Sakaguchi, et al., "Preparation and Properties of Sulfonated or Phosphonated Polybenzimidazoles and Polybenzoxazoles," *Am. Chem. Soc., Polymeric Materials Science and Engineering*, 84: 899-900 (2001).

Spry, R. J., et al. Anisotropic Ionic Conductivity of Lithium-Doped Sulfonated PBI, *J. Of Polymer Sci.: Part B: Polymer Physics*, 35: 2925-2933 (1997).

\* cited by examiner

PROTON-CONDUCTING POLYMER MEMBRANE COMPRISING A POLYMER WITH SULPHONIC ACID GROUPS AND USE THEREOF IN FUEL CELLS

RELATED APPLICATIONS

This application is the U.S. National Stage of International Application No. PCT/EP2003/008462 which was filed on 31 Jul. 2003, was published in German, and claims priority under 35 U.S.C. § 119 or 365 to German Application No. 102 35 356.5, filed on 02 Aug. 2002, and German Application No. 102 35 357.3, filed on 02 Aug. 2002.

The present invention relates to a proton-conducting polymer electrolyte membrane comprising polymers containing sulfonic acid groups, which on account of its outstanding chemical and thermal properties has diverse possible uses and is suitable in particular as a polymer electrolyte membrane (PEM) in PEM fuel cells.

A fuel cell normally comprises an electrolyte and two electrodes, separated by the electrolyte. One of the two electrodes in the case of a fuel cell is supplied with a fuel, such as hydrogen gas or a methanol/water mixture, and the other electrode with an oxidizing agent, such as oxygen gas or air, and, as a result, chemical energy from the oxidation of the fuel is converted directly into electrical energy. The oxidation reaction forms protons and electrons.

The electrolyte is permeable to hydrogen ions, i.e., protons, but not to reactive fuels such as the hydrogen gas or methanol and the oxygen gas.

A fuel cell generally comprises two or more individual cells known as MEAs (membrane electrode assemblies) each comprising an electrolyte and two electrodes, which are separated by the electrolyte.

Electrolytes employed for the fuel cell include solids such as polymer electrolyte membranes or liquids such as phosphoric acid. Polymer electrolyte membranes have attracted attention in recent times as electrolytes for fuel cells. In principle it is possible to distinguish two categories of polymer membranes.

The first category comprises cation exchange membranes composed of a polymer framework which includes covalently bonded acid groups, preferably sulfonic acid groups. The sulfonic acid group undergoes transition to an anion, and in doing so gives off a hydrogen ion, and therefore conducts protons. The mobility of the proton and hence the proton conductivity is linked directly to the water content. Owing to the very high miscibility of methanol and water, such cation exchange membranes have a high methanol permeability and are therefore unsuitable for applications in a direct methanol fuel cell. If the membrane dries out, as a result of high temperature, for example, then there is a drastic reduction in the conductivity of the membrane and, consequently, in the performance of the fuel cell. The operating temperatures of fuel cells comprising such cation exchange membranes is therefore limited to the boiling point of water. The moistening of the fuels constitutes a considerable technical challenge for the use of polymer electrolyte membrane fuel cells (PEMFCs) where conventional, sulfonated membranes such as Nafion, for example, are used.

Thus, for example, perfluorosulfonic acid polymers are used as materials for polymer electrolyte membranes. The perfluorosulfonic acid polymer (Nafion, for example) generally has a perfluorinated hydrocarbon framework, such as a copolymer of tetrafluoroethylene and trifluorovinyl, with a side chain attached to it that contains a sulfonic acid group, such as a side chain containing a sulfonic acid group attached to a perfluoroalkylene group.

The cation exchange membranes preferably comprise organic polymers containing covalently bonded acid groups, especially sulfonic acid. Methods of sulfonating polymers are described in F. Kucera et. al. Polymer Engineering and Science 1988, Vol. 38, No. 5, 783-792.

Listed below are the major types of cation exchange membranes having acquired commercial importance for use in fuel cells:

the most important representative is the perfluorosulfonic acid polymer Nafion® (U.S. Pat. No. 3,692,569). As described in U.S. Pat. No. 4,453,991, this polymer can be dissolved and then used as an ionomer. Cation exchange membranes are also obtained by filling porous support material with such an ionomer. A preferred support material is expanded Teflon (U.S. Pat. No. 5,635,041).

Another perfluorinated cation exchange membrane can be prepared as described in U.S. Pat. No. 5,422,411 by copolymerization from trifluorostyrene and sulfonyl-modified trifluorostyrene. Composite membranes composed of a porous support material, particularly expanded Teflon, filled with ionomers composed of such sulfonyl-modified trifluorostyrene copolymers are described in U.S. Pat. No. 5,834,523.

U.S. Pat. No. 6,110,616 describes copolymers of butadiene and styrene and their subsequent sulfonation for producing cation exchange membranes for fuel cells.

A further class of partly fluorinated cation exchange membranes can be produced by radiation grafting and subsequent sulfonation. In this case, as described in EP 667983 or DE 19844645, a grafting reaction is carried out on a pre-irradiated polymer film, preferably using styrene. Then, in a subsequent sulfonation reaction, the side chains are sulfonated. The grafting may also be accompanied by crosslinking, and by this means the mechanical properties can be altered.

Besides the above membranes, a further class of nonfluorinated membranes was developed through sulfonation of thermoplastics possessing high-temperature stability. Known, for instance, are membranes of sulfonated polyether ketones (DE 4219077, EP 96/01177), sulfonic polysulfone (J. Membr. Sci. 83 (1993) p. 211) or sulfonated polyphenylene sulfide (DE 19527435).

Ionomers prepared from sulfonated polyether ketones are described in WO 00/15691.

Additionally known are acid-based blend membranes which are prepared, as described in DE 19817374 or WO 01/18894, by means of mixtures of sulfonated polymers and basic polymers.

In order to improve the membrane properties further it is possible to mix a prior art cation exchange membrane with a polymer possessing high-temperature stability. The production and properties of cation exchange membranes composed of blends of sulfonated PEK and a) polysulfones (DE 4422158), b) aromatic polyamides (42445264) or c) polybenzimidazole (DE 19851498) have been described.

A disadvantage of all of these cation exchange membranes is the fact that the membrane must be moistened, the operating temperature is limited to 100° C., and the membranes have a high methanol permeability. The reason for these disadvantages is the conductivity mechanism of the membrane, where the transport of the protons is coupled to the transport of the water molecule. This is known as the "vehicle mechanism" (K.-D. Kreuer, Chem. Mater. 1996, 8, 610-641).

As a second category, polymer electrolyte membranes comprising complexes of basic polymers and strong acids have been developed. WO 96/13872, for instance, and the corresponding U.S. Pat. No. 5,525,436 describes a process for producing a proton-conducting polymer electrolyte membrane where a basic polymer, such as polybenzimidazole, is treated with a strong acid, such as phosphoric acid, sulfuric acid, etc.

J. Electrochem. Soc., Volume 142, No. 7, 1995, pp. L121-L123 describes the doping of a polybenzimidazole in phosphoric acid.

In the case of the basic polymer membranes known in the prior art the mineral acid (usually concentrated phosphoric acid) used in order to obtain the requisite proton conductivity is normally added after the polyazole film has been shaped. The polymer in this case acts as support for the electrolyte consisting of the highly concentrated phosphoric acid. The polymer membrane in this instance fulfills further key functions: in particular it is required to have a high mechanical stability and to act as separator for the two aforementioned fuels.

Key advantages of a phosphoric-acid-doped membrane of this kind is the fact that a fuel cell in which a polymer electrolyte membrane of this type is used can be operated at temperatures above 100° C. without it being otherwise necessary to moisten the fuels. This ability lies in the capacity of the phosphoric acid to be able to transport the protons without additional water, by means of what is called the D Grotthus mechanism (K.-D. Kreuer, Chem. Mater. 1996, 8, 610-641).

The possibility of operation at temperature above 100° C. opens up further advantages for the fuel cell system. First, the sensitivity of the Pt catalyst to gas contamination, especially CO, is greatly reduced. CO is formed as a byproduct in the reformation of the hydrogen-rich gas from carbonaceous compounds, such as natural gas, methanol or gasoline, for example, or else as an intermediate in the direct oxidation of methanol. Typically the CO content of the fuel at temperatures <100° C. must be lower than 100 ppm. At temperatures in the 150-200° range, however, it is possible to tolerate even 10 000 ppm of CO or more (N. J. Bjerrum et. al. Journal of Applied Electrochemistry, 2001, 31, 773-779). This leads to substantial simplifications of the upstream reformation process and hence to cost reductions for the fuel cell system as a whole.

A great advantage of fuel cells is the fact that in the course of the electrochemical reaction the energy of the fuel is converted directly into electrical energy and heat. A reaction product formed at the cathode is water. A byproduct in the electrochemical reaction, therefore, is heat. For applications where only the current is utilized for driving electrical motors, such as for automotive applications, for example, or as a replacement for battery systems in diverse respects, it is necessary to remove the heat in order to prevent the system overheating. Cooling then necessitates additional, energy-consuming appliances which further release the overall electrical efficiency of the fuel cell. For stationary applications such as for centralized or decentralized electricity and heat production the heat an be utilized efficiently by means of existing technologies such as heat exchangers. The aim in such cases is for high temperatures, in order to increase the efficiency. If the operating temperature is above 100° C. and the temperature difference between the ambient temperature and the operating temperature is large, it then becomes possible to cool the fuel cell system more efficiently, or to use smaller cooling areas, and to do without additional appliances, as compared with fuel cells which have to be operated at below 100° C. owing to the moistening of the membrane.

In addition to these advantages, however, a fuel cell system of this kind also has disadvantages. For instance, the durability of membranes doped with phosphoric acid is relatively limited. Their lifetime is lowered significantly in particular by operating the fuel cell below 100° C., at 80° C. for example. It should be noted in this context, however, that the fuel cell must be operated at these temperatures when being run up and run down.

Moreover, the production of membranes doped with phosphoric acid is relatively expensive, since normally first a prepolymer is formed and is subsequently cast with the aid of a solvent to form a film. After the film has dried it is doped with an acid in a final step.

A further problem is the relatively low mechanical stability of a polyazole film doped with phosphoric acid. Thus the membrane may be damaged by the pressure produced by the gas which acts as fuel and which flows into the fuel cell; such damage takes place if the mechanical stability is too low.

In addition the performance capabilities, such as the conductivity, of known membranes are relatively limited.

The known, phosphoric-acid-doped membranes, moreover, are unable to be used in the direct methanol fuel cell (DMFC). Cells of that kind, however, are of particular interest, since the fuel used is a methanol/water mixture. If a known membrane based on phosphoric acid is used, the fuel cell fails after a very short time.

The present invention is therefore based on the object of providing a new kind of polymer electrolyte membrane which achieves the objects depicted above. In particular, then, it should be possible to extend the operating temperature from <0° C. up to 200° C. without a very sharp reduction in the lifetime of the fuel cell.

A further intention is that a polymer electrolyte membrane should be provided which can be employed in many different fuel cells. The membrane thus ought to be suitable in particular for fuel cells which utilize hydrogen alone and also numerous carbon-containing fuels, especially natural gas, gasoline, methanol and biomass, as their energy source. In particular the membrane ought to be able to be used in a hydrogen fuel cell and in a direct methanol fuel cell (DMFC).

A membrane of the invention ought also to be inexpensive and simple to produce. Additionally, therefore, it was an object of the present invention to provide polymer electrolyte membranes which exhibit high performance capabilities, in particular a high conductivity over a wide temperature range. The conductivity ought to be achieved without additional moistening, particularly at high temperatures.

A further aim was to provide a polymer electrolyte membrane which exhibits a high mechanical stability, such as a high elasticity modulus, a high tensile strength and a high fracture toughness, for example.

Another object of the present invention, consequently, was to provide a membrane which both per se and in operation has a low permeability for a very wide variety of fuels, such as hydrogen or methanol, for example These objects are achieved by means of a proton-conducting polymer membrane comprising polymers containing sulfonic acid groups, having all of the features of claim 1. The underlying object is further achieved by an electrode having a proton-conducting polymer coating based on polyazoles, with all of the features of claim 19.

The present invention provides a proton-conducting polymer membrane comprising polymers containing sulfonic acid groups, obtainable by a process comprising the steps of A) mixing vinyl-containing sulfonic acid with one or more aromatic tetramino compounds with one or more aromatic carboxylic acids, their esters, their acid halides or their acid anhydrides, containing at least two acid groups per carboxylic acid monomer, and/or mixing vinyl-containing sulfonic acid with one or more aromatic and/or heteroaromatic diaminocarboxylic acids, their esters, their acid halides or their acid anhydrides, B) heating the mixture obtainable according to step A) under inert gas to temperatures of up to 350° C., to form polyazole polymers, C) applying a layer to a support, using the mixture according to step A) and/or B), D) polymerizing the vinyl-containing sulfonic acid present in the sheetlike structure obtainable according to step C).

A membrane of the invention exhibits high conductivity, obtained even without additional moistening, over a large temperature range. Moreover, a fuel cell equipped with a membrane of the invention can be operated even at low temperatures, at 80° C. for example, without thereby greatly lowering the lifetime of the fuel cell.

A polymer electrolyte membrane of the invention possesses very low methanol permeability and is therefore particularly suitable for use in a DMFC. It is thus possible to operate a fuel cell long term with a large number of fuels, such as hydrogen, natural gas, gasoline, methanol or biomass.

A membrane of the invention can also be produced simply and inexpensively. In particular there is no need for large amounts of solvents which are expensive and a hazard to health, such as dimethylacetamide.

Membranes of the present invention, moreover, exhibit high mechanical stability, in particular a high elasticity modulus, high tensile strength and high fracture toughness. These membranes additionally have a surprisingly long life.

Vinyl-containing sulfonic acids are known in the art. These are compounds which contain at least one carbon-carbon double bond and at least one sulfonic acid group. The two carbon atoms forming the carbon-carbon double bond have at least two, preferably 3, bonds to groups which lead to low stearic hindrance of the double bond. These groups include hydrogen atoms and halogen atoms, particularly fluorine atoms. In the context of the present invention the polyvinylsulfonic acid is the polymerization product obtained by polymrerizing the vinyl-containing sulfonic acid alone or with further monomers and/or crosslinkers.

The vinyl-containing sulfonic acid may contain one, two, three or more carbon-carbon double bonds. The vinyl-containing sulfonic acid may further contain two, three or more sulfonic acid groups.

Generally speaking, the vinyl-containing sulfonic acid contains 2 to 20, preferably 2 to 10, carbon atoms.

The vinyl-containing sulfonic acid used in step A) preferably comprises compounds of the formula

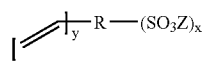

in which

R is a bond, a C1-C15 alkyl group, C1-C15 alkoxy group, ethyleneoxy group or C5-C20 aryl or heteroaryl group, it being possible for the above radicals to be substituted in turn by halogen, —OH, COOZ, —CN, NZ$_2$, Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and x is an integer 1, 2, 3, 4, 5, 6, 7, 8, 9 or 10, y is an integer 1, 2, 3, 4, 5, 6, 7, 8, 9 or 10 and/or of the formula

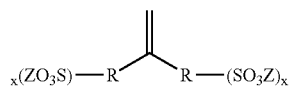

in which

R is a bond, a C1-C5 alkyl group, C1-C15 alkoxy group, ethyleneoxy group or C5-C20 aryl or heteroaryl group, it being possible for the above radicals to be substituted in turn by halogen, —OH, COOZ, —CN, NZ$_2$, Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and x is an integer 1, 2, 3, 4, 5, 6, 7, 8, 9 or 10, and/or of the formula

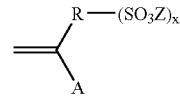

in which

A is a group of the formulae COOR$^2$, CN, CONR$^2_2$, OR$^2$ and/or R$^2$, in which R$^2$ is hydrogen, a C1-C15 alkyl group, C1-C15-alkoxy group, ethyleneoxy group or C5-C20 aryl or heteroaryl group, it being possible for the above radicals to be substituted in turn by halogen, —OH, COOZ, —CN, NZ$_2$, R is a bond, a divalent C1-C15 alkylene group, divalent C1-C15 alkyleneoxy group, such as ethyleneoxy group or divalent C5-C20 aryl or heteroaryl group, it being possible for the above radicals to be substituted in turn by halogen, —OH, COOZ, —CN, NZ$_2$, Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and x is an integer 1, 2, 3, 4, 5, 6, 7, 8, 9 or 10.

The preferred vinyl-containing sulfonic acids include alkenes which contain sulfonic acid groups, such as ethenesulfonic acid, propenesulfonic acid, butenesulfonic acid; acrylic acid and/or methacrylic acid compounds containing sulfonic acid groups, such as 2-sulfomethylacrylic acid, 2-sulfomethylmethacrylic acid, 2-sulfomethylacrylamide and 2-sulfomethylmethacrylamide, for example.

Particular preference is given to using commercial vinyl-sulfonic acid (ethenesulfonic acid) such as is obtainable for example from Aldrich or Clariant GmbH. A preferred vinyl-sulfonic acid has a purity of more than 70%, in particular 90% and more preferably more than 97% purity.

The vinyl-containing sulfonic acids can additionally be used in the form of derivatives which can be converted subsequently into the acid, it being possible for the conversion to the acid to take place in the polymerized state as well. Such derivatives include in particular the salts, the esters, the amides and the halides of the vinyl-containing sulfonic acids.

The mixture prepared in step A) contains preferably at least 1%, in particular at least 5% and more preferably at least 20% by weight, based on the total weight, of vinyl-containing sulfonic acid. According to one particular aspect of the present invention the mixture prepared in step A) contains not more than 60% by weight of monomers for preparing polyazoles, in particular not more than 50% by weight of monomers for preparing polyazoles and more preferably not more than 30% by weight, based on the total weight, of monomers for preparing polyazoles.

According to one particular embodiment of the present invention the mixture according to step A) comprises vinyl-containing phosphonic acids. Through the addition of vinyl-containing phosphonic acid it is possible, surprisingly, to improve the high-temperature properties of the membrane. These phosphonic acids, used even in a relatively small amount, allow a membrane of the invention to be operated short term, even without moistening, without the membrane being destroyed as a result. If the fraction of vinyl-containing phosphonic acid is increased, the performance capability increases as the temperature increases, and this capability is obtained even without moistening.

The polyvinylphosphonic acid present in the membrane, which may also be crosslinked by means of reactive groups, forms an interpenetrating network with the polymer possessing high-temperature stability. There is therefore a marked reduction in the leaching of the electrolyte by product water or in the case of a DMFC by the aqueous fuel. A polymer electrolyte membrane of the invention possesses very low methanol permeability and is particularly suitable for use in a DMFC. Thus long-term operation of a fuel cell with a multiplicity of fuels, such as hydrogen, natural gas, gasoline, methanol or biomass, is possible. The membranes make it possible for these fuels to have a particularly high activity. The methanol oxidation is able to take place here with high activity at high temperatures. In one particular embodiment these membranes are suitable for operation in a so-called vapor-form DMFC, in particular at temperatures in the range from 100 to 200° C.

As a result of the possibility of operating at temperatures above 100° C. there is a sharp reduction in the sensitivity of the Pt catalyst to gas contamination, particularly by CO. CO is formed as a byproduct in the reformation of the hydrogen-rich gas from carbonaceous compounds, such as natural gas, methanol or gasoline, for example, or else as an intermediate in the direct oxidation of methanol. Typically the CO content of the fuel at temperatures above 120° C. can be greater than 5000 ppm without drastically reducing the catalytic action of the Pt catalyst. At temperatures in the 150-200° range, however, it is possible to tolerate even 10 000 ppm of CO or more (N. J. Bjerrum et. al. Journal of Applied Electrochemistry, 2001, 31, 773-779). This leads to substantial simplifications of the upstream reformation process and hence to cost reductions for the fuel cell system as a whole.

A membrane of the invention with high phosphonic acid content exhibits high conductivity over a large temperature range, obtained even without additional moistening. Furthermore, a fuel cell equipped with a membrane of the invention can be operated even at low temperatures, for example at 5° C. With moistening, provided the sulfonic acid content is relatively high.

Vinyl-containing phosphonic acids are known in the art. These are compounds which contain at least one carbon-carbon double bond and at least one phosphonic acid group. The two carbon atoms forming the carbon-carbon double bond have at least two, preferably 3, bonds to groups which lead to low stearic hindrance of the double bond. These groups include hydrogen atoms and halogen atoms, particularly fluorine atoms. In the context of the present invention the polyvinylphosphonic acid is the polymerization product obtained by polymerizing the vinyl-containing phosphonic acid alone or with further monomers and/or crosslinkers.

The vinyl-containing phosphonic acid may contain one, two, three or more carbon-carbon double bonds. The vinyl-containing phosphonic acid may further contain two, three or more phosphonic acid groups.

Generally speaking, the vinyl-containing phosphonic acid contains 2 to 20, preferably 2 to 10, carbon atoms.

The vinyl-containing phosphonic acid used in step A) preferably comprises compounds of the formula

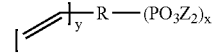

in which
R is a bond, a C1-C15 alkyl group, C1-C15 alkoxy group, ethyleneoxy group or C5-C20 aryl or heteroaryl group, it being possible for the above radicals to be substituted in turn by halogen, —OH, COOZ, —CN, NZ$_2$,
Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and
x is an integer 1, 2, 3, 4, 5, 6, 7, 8, 9 or 10,
y is an integer 1, 2, 3, 4, 5, 6, 7, 8, 9 or 10
and/or of the formula

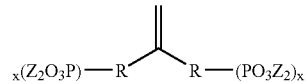

in which
R is a bond, a C1-C15 alkyl group, C1-C15 alkoxy group, ethyleneoxy group or C5-C20 aryl or heteroaryl group, it being possible for the above radicals to be substituted in turn by halogen, —OH, COOZ, —CN, NZ$_2$,
Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and
x is an integer of 1, 2, 3, 4, 5, 6, 7, 8, 9 or 10, and/or of the formula

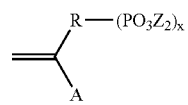

in which

A is a group of the formulae COOR², CN, CONR²₂, OR² and/or R², in which
  R² is hydrogen, a C1-C15 alkyl group, C1-C15-alkoxy group, ethyleneoxy group or C5-C20 aryl or heteroaryl group, it being possible for the above radicals to be substituted in turn by halogen, —OH, COOZ, —CN, NZ₂,
R is a bond, a divalent C1-C15 alkylene group, divalent C1-C15 alkyleneoxy group, such as ethyleneoxy group or divalent C5-C20 aryl or heteroaryl group, it being possible for the above radicals to be substituted in turn by halogen, —OH, COOZ, —CN, NZ₂,
Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and
x is an integer 1, 2, 3, 4, 5, 6, 7, 8, 9 or 10.

The preferred vinyl-containing phosphonic acids include alkenes which contain phosphonic acid groups, such as ethenephosphonic acid, propenephosphonic acid, butenephosphonic acid; acrylic acid and/or methacrylic acid compounds containing phosphonic acid groups, such as 2-phosphonomethylacrylic acid, 2-phosphonomethylmethacrylic acid, 2-phosphonomethylacrylamide and 2-phosphonomethylmethacrylamide, for example.

Particular preference is given to using commercial vinylphosphonic acid (ethenephosphonic acid) such as is obtainable for example from Aldrich or Clariant GmbH. A preferred vinylphosphonic acid has a purity of more than 70%, in particular 90% and more preferably more than 97% purity.

The vinyl-containing phosphonic acids can additionally be used in the form of derivatives which can be converted subsequently into the acid, it being possible for the conversion to the acid to take place in the polymerized state as well. Such derivatives include in particular the salts, the esters, the amides and the halides of the vinyl-containing phosphonic acids.

The use of vinyl-containing phosphonic acid is optional. The mixture prepared in step A) contains preferably at least 20%, in particular at least 30% and more preferably at least 50% by weight, based on the total weight of the mixture, of vinyl-containing phosphonic acid.

The mixture prepared in step A) may further comprise other organic and/or inorganic solvents. The organic solvents include in particular polar aprotic solvents, such as dimethyl sulfoxide (DMSO), esters, such as ethyl acetate, and polar protic solvents, such as alcohols, such as ethanol, propanol, isopropanol and/or butanol. The inorganic solvents include in particular water, phosphoric acid and polyphosphoric acid.

These may have a positive influence on the processing properties. In particular it is possible by adding the organic solvent to improve the solubility of polymers which are formed, for example, in step B). The amount of vinyl-containing sulfonic acid in such solutions is generally at least 5%, preferably at least 10% and more preferably between 10 and 97% by weight. The amount of vinyl-containing phosphonic acid in such solutions is preferably at least 5%, more preferably at least 10% and very preferably between 10 and 97% by weight.

The weight ratio of vinyl-containing phosphonic acid to vinyl-containing sulfonic acid may vary widely. Preferably the ratio of vinyl-containing phosphonic acid to vinyl-containing sulfonic acid is in the range from 1:100 to 99:1, in particular in the range from 1:10 to 10:1. With a ratio of greater than or equal to 1:1, in particular greater than or equal to 3:1, very preferably greater than or equal to 5:1, the membrane can be operated even at temperatures greater than 100° C. without moistening.

The mixture prepared in step A) preferably contains at least 10% by weight, in particular at least 20 to 98% by weight, of vinyl-containing sulfonic acid and/or vinyl-containing phosphonic acid.

According to one particular aspect of the present invention the ratio of vinyl-containing phosphonic acid to vinyl-containing sulfonic acid is in the range from 1:99 to 99:1, preferably from 1:50 to 50:1, based on the weight, without any intention that this should constitute a restriction.

The aromatic and heteroaromatic tetraamino compounds used in accordance with the invention are preferably 3,3',4,4'-tetraaminobiphenyl, 2,3,5,6-tetraaminopyridine, 1,2,4,5-tetraaminobenzene, 3,3',4,4'-tetraaminodiphenyl sulfone, 3,3',4,4'-tetraaminodiphenyl ether, 3,3',4,4'-tetraaminobenzophenone, 3,3',4,4'-tetraaminodiphenyl methane and 3,3', 4,4'-tetraaminodiphenyldimethyl methane and salts thereof, in particular their mono-, di-, tri- and tetrahydrochloride derivatives.

The aromatic carboxylic acids used in accordance with the invention are dicarboxylic acids and tricarboxylic acids and tetracarboxylic acids or their esters, their anhydrides or their acid halides, in particular their acid chlorides. The term "aromatic carboxylic acids" embraces equally heteroaromatic carboxylic acids as well. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalene-dicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, and their C1-C20 alkyl esters or C5-C12 aryl esters, or their acid anhydrides or their acid chlorides. The aromatic tri- and tetracarboxylic acids or their C1-C20 alkyl esters or C5-C12 aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid and 3,5,4'-biphenyltricarboxylic acid.

The aromatic tetracarboxylic acids or their C1-C20 alkyl esters or C5-C12 aryl esters or their acid anhydrides or their acid chlorides are preferably 3,5,3',5'-biphenyl-tetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid and 1,4,5,8-naphthalenetetracarboxylic acid.

The heteroaromatic carboxylic acids used in accordance with the invention are heteroaromatic dicarboxylic and tricarboxylic and tetracarboxylic acids and their esters or their anhydrides. By heteroaromatic carboxylic acids are meant aromatic systems which contain at least one nitrogen, oxygen, sulfur or phosphorus atom in the aromatic moiety. Compounds in question are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid. Also, their C1-C20 alkyl esters or C5-C12 aryl esters, or their acid anhydrides or their acid chlorides.

The amount of tricarboxylic acid and/or tetracarboxylic acids (based on dicarboxylic acid used) is between 0 and 30 mol %, preferably 0.1 and 20 mol %, in particular 0.5 and 10 mol %.

The aromatic and heteroaromatic diaminocarboxylic acids used in accordance with the invention are preferably diaminobenzoic acid and the mono- and dihydrochloride derivatives thereof.

It is preferred in step A) to use mixtures of at least two different aromatic carboxylic acids. Particular preference is given to using mixtures which in addition to aromatic carboxylic acids also include heteroaromatic carboxylic acids. The mixture ratio of aromatic carboxylic acids to heteroaromatic carboxylic acids is between 1:99 and 99:1, preferably from 1:50 to 50:1.

These mixtures are, in particular, mixtures of N-heteroaromatic dicarboxylic acids and aromatic dicarboxylic acids. Nonlimiting examples thereof are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxlic acid, benzophenone-4,4'-dicarboxylic acid, diphenyl sulfone 4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazole-dicarboxylic acid, 2,6-pyrimidinedicarboxylic acid and 2,5-pyrazinedicarboxylic acid.

If the aim is to maximize the molecular weight, the molar ratio of carboxylic acid groups to amino groups in the reaction of tetraamino compounds with one or more aromatic carboxylic acids and/or their esters, containing at least two acid groups per carboxylic acid monomer, is preferably in the vicinity of 1:2.

The mixture prepared in step A) preferably contains at least 2% by weight, in particular from 5 to 20% by weight, of monomers for preparing polyazoles.

The polyazole-based polymer formed in step B) contains repeating azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

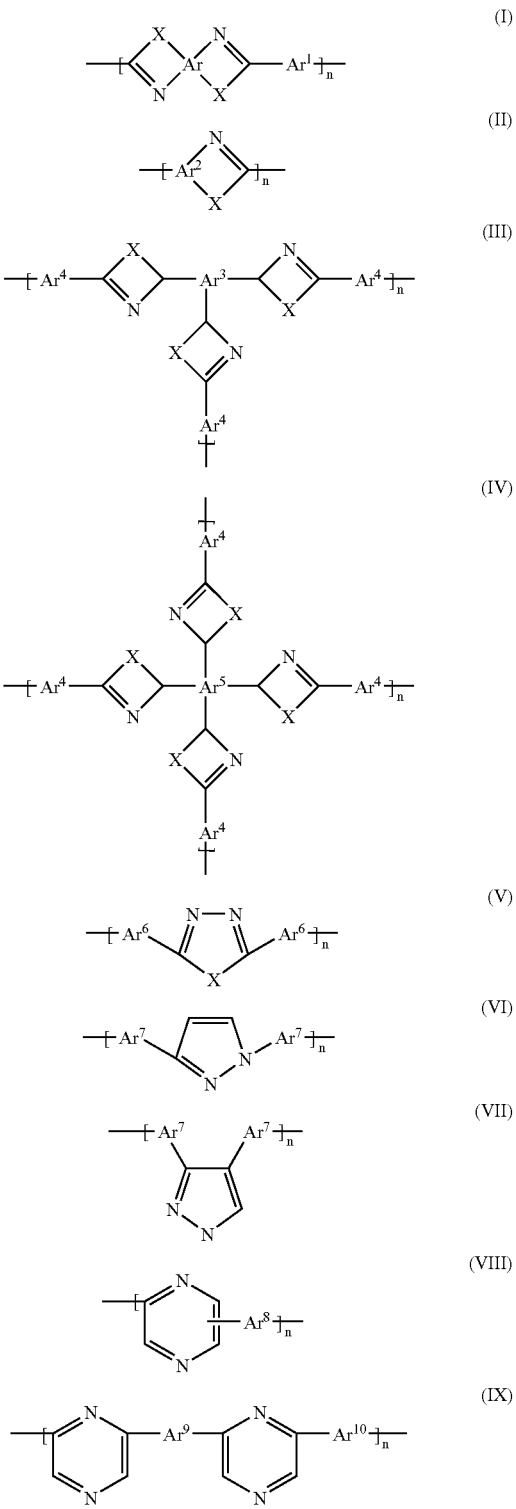

-continued

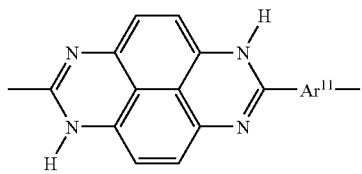
(X)

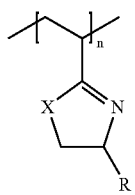
(XI)

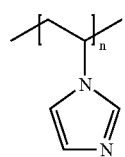
(XII)

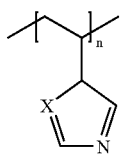
(XIII)

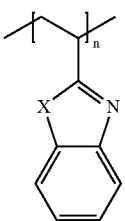
(XIV)

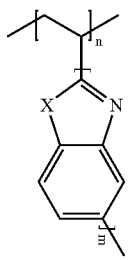
(XV)

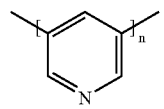
(XVI)

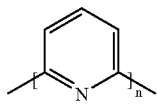
(XVII)

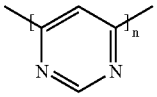
(XVIII)

-continued

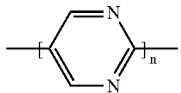
(XIX)

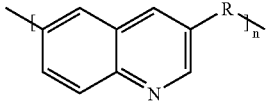
(XX)

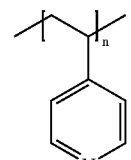
(XXI)

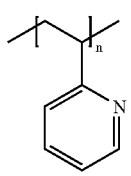
(XXII)

in which

Ar is identical or different at each occurrence and is a tetravalent aromatic or heteroaromatic group which may be monocyclic or polycyclic, $Ar^1$ is identical or different at each occurrence and is a divalent aromatic or heteroaromatic group which may be monocyclic or polycyclic, $Ar^2$ is identical or different at each occurrence and is a divalent or trivalent aromatic or heteroaromatic group which may be monocyclic or polycyclic, $Ar^3$ is identical or different at each occurrence and is a trivalent aromatic or heteroaromatic group which may be monocyclic or polycyclic, $Ar^4$ is identical or different at each occurrence and is a trivalent aromatic or heteroaromatic group which may be monocyclic or polycyclic, $Ar^5$ is identical or different at each occurrence and is a tetravalent aromatic or heteroaromatic group which may be monocyclic or polycyclic, $Ar^6$ is identical or different at each occurrence and is a divalent aromatic or heteroaromatic group which may be monocyclic or polycyclic, $Ar^7$ is identical or different at each occurrence and is a divalent aromatic or heteroaromatic group which may be monocyclic or polycyclic, $Ar^8$ is identical or different at each occurrence and is a trivalent aromatic or heteroaromatic group which may be monocyclic or polycyclic, $Ar^9$ is identical or different at each occurrence and is a divalent or trivalent or tetravalent aromatic or heteroaromatic group which may be monocyclic or polycyclic, $Ar^{10}$ is identical or different at each occurrence and is a divalent or trivalent aromatic or heteroaromatic group which may be monocyclic or polycyclic, $Ar^{11}$ is identical or different at each occurrence and is a divalent aromatic or heteroaromatic group which may be monocyclic or polycyclic, X is identical or different at each occurrence and is oxygen, sulfur or an amino group which carries a hydrogen atom, a group of 1-20 carbon atoms, preferably a branched or unbranched alkyl or alkoxy group, or an aryl group as further radical, R is identical or different at each occurrence and is hydrogen, an alkyl group and an aromatic group identical or different at each occurrence and is hydrogen, an alkyl group and an aromatic group with the proviso that R in formula XX is a divalent group, and n, m is an integer greater than or equal to 10, preferably greater than or equal to 100.

Aromatic or heteroaromatic groups preferred in accordance with the invention derive from benzene, naphthalene, biphenyl, diphenyl ether, diphenylmethane, diphenyl-dimethylmethane, bisphenone, diphenyl sulfone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which if desired may also be substituted.

The substitution pattern of $Ar^1$, $Ar^4$, $Ar^6$, $Ar^7$, $Ar^8$, $Ar^9$, $Ar^{10}$ and $Ar^{11}$ is arbitrary; in the case of phenylene, for example, $Ar^1$, $Ar^4$, $Ar^6$, $Ar^7$, $Ar^8$, $Ar^9$, $Ar^{10}$ or $Ar^{11}$ can be ortho-, meta- and para-phenylene. Particularly preferred groups derive from benzene and biphenylene, which if desired may also be substituted.

Preferred alkyl groups are short-chain alkyl groups having 1 to 4 carbon atoms, such as methyl, ethyl, n- or isopropyl and t-butyl groups.

Preferred aromatic groups are phenyl or naphthyl groups. The alkyl groups and the aromatic groups can be substituted.

Preferred substituents are halogen atoms such as fluorine, for example, amino groups, hydroxyl groups or short-chain alkyl groups such as methyl or ethyl groups, for example.

Preference is given to polyazoles containing repeating units of the formula (I) wherein the radicals X are the same within one repeating unit.

The polyazoles may in principle also have different repeating units, differing for example in their radical X. Preferably, however, there are only identical radcials X in one repeating unit.

Further preferred polyazole polymers are polyimidazoles, polybenzothiazoles, polybenzoxazoles, polyoxadiazoles, polyquinoxalines, polythiadiazoles poly(pyridines), poly(pyrimidines), and poly(tetrazapyrenes).

In a further embodiment of the present invention the polymer comprising repeating azole units is a copolymer or a blend that comprises at least two units of the formula (I) to (XXII) that are different from one another. The polymers may be in the form of block copolymers (diblock, triblock), random copolymers, periodic copolymers and/or alternating polymers.

In one particularly preferred embodiment of the present invention the polymer comprising repeating azole units is a polyazole which contains only units of the formula (I) and/or (II).

The number of repeating azole units in the polymer is preferably an integer greater than or equal to 10. Particularly preferred polymers comprise at least 100 repeating azole units.

In the context of the present invention polymers comprising repeating benzimidazole units are preferred. Some examples of the very advantageous polymers comprising repeating benzimidazole units are shown by the following formulae:

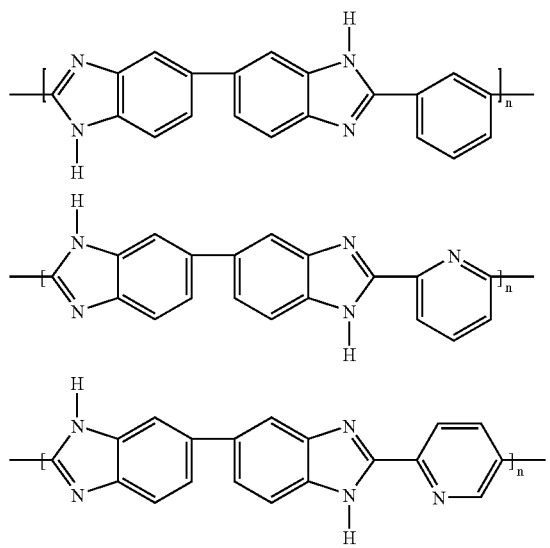
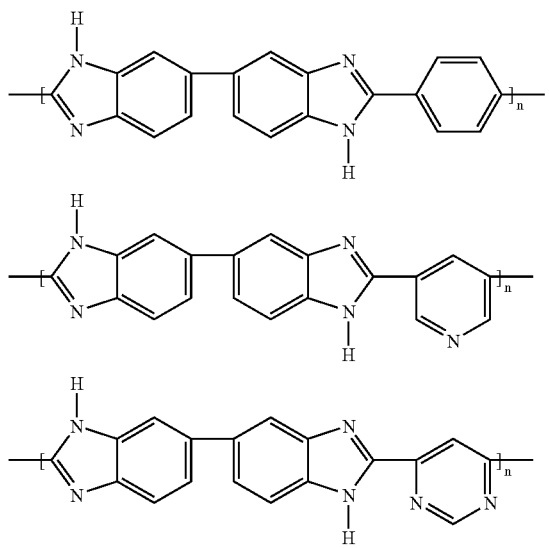

-continued
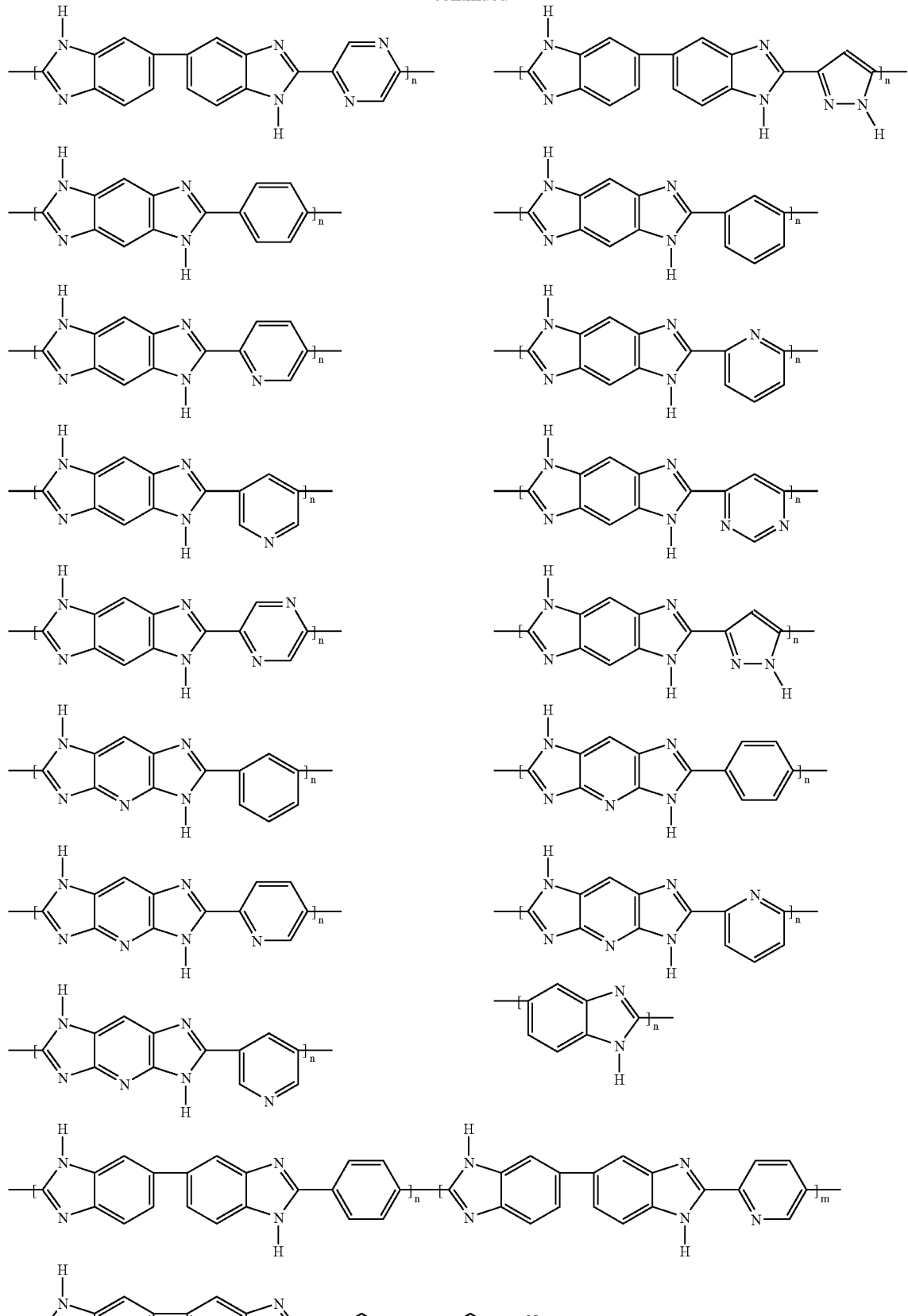

where n and m are each an integer greater than or equal to 10, preferably greater than or equal to 100.

The polyazoles obtainable by means of the process described, but in particular the polybenzimidazoles, generally feature a high molecular weight. Measured as the intrinsic viscosity, said molecular weight is preferably at least 0.2 dl/g, more preferably from 0.7 to 10 dl/g, in particular from 0.8 to 5 dl/g.

Where the mixture according to step A) also includes tricarboxylic acids and/or tetracarboxylic acid, this produces branching/crosslinking in the polymer formed. This contributes to improving the mechanical quality.

The mixture obtained in step A) is heated according to step B) to a temperature of up to 350° C., preferably up to 280° C., in particular up to 200° C. and preferably in the range from 100° C. to 250° C. and more preferably in the range from 100° C. to 200° C. An inert gas, nitrogen for example, or a noble gas, such as neon or argon, is used during heating.

The purpose of step B) is to react the carboxylic acid groups with the amino groups. This reaction releases water. According to one particular aspect of the present invention the water formed in step B) is removed from the reaction equilibrium. Methods are widespread in the art. The water can be removed by distillation, for example. The water can also be bound by means of drying agents. Depending on the nature of the drying agent it may remain in the reaction mixture or be separated from the reaction mixture. Drying agents which can be used include phosphorus pentoxide ($P_2O_5$) or silica gel.

In one version of the process the heating according to step B) may take place after a sheetlike structure has been formed according to step C).

In a further embodiment of the invention it is possible to use monomers capable of crosslinking. Depending on the temperature stability of the monomer it can be added to the mixture according to step A) or following the preparation of polyazoles according to step B). Additionally the monomers capable of crosslinking may also be applied to the sheetlike structure according to step C).

The monomers capable of crosslinking are, in particular, compounds containing at least 2 carbon-carbon double bonds. Preference is given to dienes, trienes, tetraenes, dimethylacrylates, trimethylacrylates, tetramethylacrylates, diacrylates, triacrylates and tetraacrylates.

Particular preference is given to dienes, trienes and tetraenes of the formula

dimethylacrylates, trimethylacrylates, and tetramethylacrylates of the formula

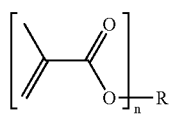

diacrylates, triacrylates and tetraacrylates of the formula

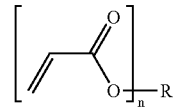

in which
R is a C1-C15 alkyl group, C5-C20 aryl or heteroaryl group, NR', —$SO_2$, PR', Si(R')$_2$, it being possible for the above radicals in turn to be substituted,
R' independently at each occurrence is hydrogen, a C1-C15 alkyl group, C1-C15 alkoxy group, C5-C20 aryl or heteroaryl group and
n is at least 2.

The substituents of the above radical R are preferably halogen, hydroxyl, carboxy, carboxyl, carboxyl ester, nitriles, amines, silyl, siloxane radicals.

Particularly preferred crosslinkers are allyl methacrylate, ethylene glycol dimethacrylate, diethylene glycol dimethacrylate, triethylene glycol dimethacrylate, tetraethylene and polyethylene glycol dimethacrylate, 1,3-butanediol dimethacrylate, glycerol dimethacrylate, diurethane dimethacrylate, trimethylpropane trimethacrylate, epoxy acrylates, Ebacryl for example, N',N-methylenebisacrylamide, carbinol, butadiene, isoprene, chloroprene, divinylbenzene and/or bisphenol A dimethylacrylate. These compounds are available commercially, for example, from Sartomer Company Exton, Pa. under the names CN-120, CN104 and CN-980.

The use of crosslinkers is optional; these compounds can be used usually in the range between 0.05 to 30% by weight, preferably 0.1 to 20% by weight, more preferably 1 and 10% by weight, based on the weight of vinyl-containing sulfonic acid and, where used, vinyl-containing phosphonic acid.

The mixture of the polymer produced in step A) may be a solution, and dispersed or suspended polymer may also be present in this mixture.

The preferred polymers include polyolefins such as poly(chloroprene), polyacetylene, polyphenylene, poly(p-xylylene), polyarylmethylene, polystyrene, polymethylstyrene, polyvinyl alcohol, polyvinyl acetate, polyvinyl ether, polyvinylamine, poly(N-vinyl-acetamide), polyvinylimidazole, polyvinylcarbazole, polyvinylpyrrolidone, polyvinylpyridine, polyvinyl chloride, polyvinylidene chloride, polytetrafluoroethylene, polyvinyl difluoride, polyhexafluoropropylene, polyethylene-tetrafluoroethylene, copolymers of PTFE with hexafluoropropylene, with perfluoropropyl vinyl ether, with trifluoronitrosomethane, with carbalkoxy-perfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, particularly of norbornene;

polymers having C—O bonds in the main chain, examples being polyacetal, polyoxymethylene, polyethers, polypropylene oxide, polyepichlorohydrin, polytetrahydrofuran, polyphenylene oxide, polyether ketone, polyether ether ketone, polyether ketone ketone, polyether ether ketone ketone, polyether ketone ether ketone ketone, polyesters, especially polyhydroxyacetic acid, polyethylene terephthalate, polybutylene terephthalate, polyhydroxybenzoate, polyhydroxypropionic acid, polypropionic acid, polypivalolactone, polycaprolactone, furan resins, phenol-aryl resins, polymalonic acid and polycarbonate;

polymers C—S bonds in the main chain, examples being polysulfide ethers, polyphenylene sulfide, polyether sulfone, polysulfone, polyether ether sulfone, polyaryl ether sulfone, polyphenylene sulfone, polyphenylene sulfide sulfone and poly(phenyl sulfide-1,4-phenylene;

polymers C—N bonds in the main chain, examples being polyimines, polyisocyanides, polyetherimine, polyetherimides, poly(trifluoromethyl)bis(phthalimide)phenyl, polyaniline, polyaramids, polyamides, polyhydrazides, polyurethanes, polyimides, polyazoles, polyazole ether ketone, polyureas, polyazines;

liquid-crystalline polymers, especially Vectra; and inorganic polymers, examples being polysilanes, polycarbosilanes, polysiloxanes, polysilica, polysilicates, silicones, polyphosphazenes and polythiazyl.

In order to improve the performance properties further it is possible for fillers as well to be added to the membrane, especially proton-conducting fillers, and also additional acids. The addition can be made for example in step A), step B), step C) and/or step D). These additives, if they are in liquid form, can also be added after the polymerization according to step D).

Nonlimiting examples of proton-conducting fillers are sulfates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacid such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ selenides and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, oxides such as $Al_2O_3$, $Sb_2O_5$, $ThO_2$, $SnO_2$, $ZrO_2$, $MoO_3$ silicates such as zeolites, zeolites($NH_4$+), sheet silicates, framework silicates, H-natrolite, H-mordenite, $NH_4$-analcine, $NH_4$-sodalite, $NH_4$-gallate, H-montmorillonite acids such as $HClO_4$, $SbF_5$ fillers such as carbides, especially SiC, $Si_3N_4$, fibers, especially glass fibers, glass powders and/or polymer fibers, preferably based on polyazoles.

These additives may be present in usual amounts in the proton-conducting polymer membrane, although the positive properties of the membrane, such as high conductivity, long life and high mechanical stability, ought not to be too greatly affected by adding excessive amounts of additives. In general the membrane after the polymerization according to step D) contains not more than 80% by weight, preferably not more than 50% by weight and more preferably not more than 20% by weight of additives.

Said membrane may also further comprise perfluorinated sulfonic acid additives (preferably 0.1-20% by weight, more preferably 0.2-151% by weight, very preferably 0.2-10% by weight). These additives lead to performance improvement, to an increase in oxygen solubility and oxygen diffusion in the vicinity of the cathode, and to a reduction in the adsorption of phosphoric acid and phosphate to platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Nonlimiting examples of persulfonated additives are:

trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexasulfonate, perfluorosulfoimides and Nafion.

The sheetlike structure is formed according to step B) by means of measures which are known per se (casting, spraying, knife coating, extrusion), being known from the prior art relating to polymer film production. Accordingly the mixture is suitable for forming a sheetlike structure. The mixture can accordingly constitute a solution or a suspension, the fraction of the components of low solubility being limited to quantities which allow sheetlike structures to be formed. Suitable supports are all supports which can be termed inert under the conditions. These supports include, in particular, films of polyethylene terephthalate (PET), polytetrafluoroethylene (PTFE), polyhexafluoropropylene, copolymers of PTFE with hexafluoropropylene, polyimides, polyphenylene sulfides (PPS) and polypropylene (PP).

To adjust the viscosity it is possible where appropriate to add water and/or a readily evaporable organic solvent to the mixture. This allows the viscosity to be adjusted to the desired value and makes it possible to facilitate the formation of the membrane. The thickness of the sheetlike structure is generally between 15 and 2000 μm, preferably between 30 and 1500 μm, in particular between 50 and 1200 μm, but this should not be taken to constitute a restriction.

The polymerization of the vinyl-containing sulfonic acid and, where present, vinyl-containing phosphonic acid in step D) takes place preferably by free-radical means. The free radicals may be formed thermally, photochemically, chemically and/or electrochemically.

By way of example, an initiator solution which comprises at least one substance capable of forming free radicals can be added to the mixture after the heating of the solution and/or dispersion according to step B). It is also possible to apply an initiator solution to the sheetlike structure obtained after step C). This can be done by means of measures known per se (e.g., spraying, dipping, etc.), being known from the prior art.

Suitable free-radical initiators include azo compounds, peroxy compounds, persulfate compounds or azoamidines. Nonlimiting examples are dibenzoyl peroxide, dicumene peroxide, cumene hydroperoxide, diisopropyl peroxydicarbonate, bis(4-t-butylcyclohexyl)peroxydicarbonate, dipotassium persulfate, ammonium peroxydisulfate, 2,2'-azobis(2-methylpropionitrile) (AIBN), 2,2'-azobis(isobutyramidine) hydrochloride, benzopinacol, dibenzyl derivatives, methyl ethylene ketone peroxide, 1,1-azobiscyclohexanecarbonitrile, methyl ethyl ketone peroxide, acetylacetone peroxide, dilauryl peroxide, didecanoyl peroxide, tert-butyl per-2-ethylhexanoate, ketone peroxide, methyl isobutyl ketone peroxide, cyclohexanone peroxide, dibenzoyl peroxide, tert-butyl peroxybenzoate, tert-butyl peroxyisopropyl carbonate, 2,5-bis(2-ethylhexanoylperoxy)-2,5-dimethylhexane, tert-butyl peroxy-2-ethyl hexanoate, tert-butyl peroxy-3,5,5-trimethyl hexanoate, tert-butyl peroxyisobutyrate, tert-butyl peroxyacetate, dicumyl peroxide, 1,1-bis(tert-butylperoxy) cyclohexane, 1,1-bis(tert-butylperoxy)-3,3,5-trimethylcyclohexane, cumyl hydroperoxide, tert-butyl hydroperoxide, bis(4-tert-butylcyclohexyl)peroxydicarbonate, and also the free-radical initiators obtainable from DuPont under the ®Vazo name, examples being ®Vazo V50 and ®Vazo WS.

It is additionally possible to use free-radical initiators which form free radicals under irradiation. The preferred compounds include α,α-diethoxyacetophenone (DEAP, Upjon Corp), n-butylbenzoin ether (®Trigonal-14, AKZO) and 2,2-dimethoxy-2-phenylacetophenone (®Irgacure 651) and 1-benzoylcyclohexanol (®Irgacure 184), bis(2,4,6-trimethylbenzoyl)phenylphosphine oxide®Irgacure 819) and 1-[4-(2-hydroxyethoxy)phenyl]-2-hydroxy-2-phenylpropan-1-one (®Irgacure 2959), each of which are available commercially from Ciba Geigy Corp.

It is usual to add between 0.0001 and 5% by weight, in particular 0.01 to 3% by weight (based on the sum of vinyl-containing sulfonic acid and, where used, vinyl-containing phosphonic acid), of free-radical initiator. The amount of free-radical initiator can be varied depending on the desired degree of polymerization.

The polymerization may also take place by exposure to IR or NIR (IR=infrared, i.e., light having a wavelength of more than 700 nm; NIR=near IR, i.e., light having a wavelength in the range from about 700 to 2000 nm or an energy in the range from about 0.6 to 1.75 eV).

The polymerization may also take place by exposure to UV light having a wavelength of less than 400 nm. This polymerization method is known per se and is described for example in Hans Joerg Elias, Makromolekulare Chemie, 5th Edition, Volume 1, see 492-511; D. R. Arnold, N. C. Baird, J. R. Bolton, J. C. D. Brand, P. W. M Jacobs, P. de Mayo, W. R. Ware, Photochemistry-An Introduction, Academic Press, New York and M. K. Mishra, Radical Photopolymerization of Vinyl Monomers, J. Macromol. Sci.-Revs. Macromol. Chem. Phys. C22(1982-1983) 409.

Polymerization can also be brought about by exposure to β, γ and/or electron beams. According to one particular embodiment of the present invention a membrane is irradiated with a radiation dose in the range from 1 to 300 kGy, preferably from 3 to 200 kGy and very preferably from 20 to 100 kGy.

The polymerization of the vinyl-containing sulfonic acid and, where used, the vinyl-containing phosphonic acid in step D) takes place preferably at temperatures above room temperature (20° C.) and less than 200° C., in particular at temperatures between 40° C. and 150° C., more preferably between 50° C. and 120° C. The polymerization takes place preferably under atmospheric pressure, but may also take place with exposure to superatmospheric pressure. The polymerization leads to solidification of the sheetlike structure, and this solidification can be monitored by measuring microhardness. The increase in hardness brought about as a result of the polymerization is preferably at least 20%, based on the hardness of the sheetlike structure obtained in step B).

In accordance with one particular embodiment of the present invention the membranes have a high mechanical stability. This parameter is given by the hardness of the membrane, which is determined by means of microhardness measurement in accordance with DIN 50539. For the measurement, the membrane is exposed successively over the course of 20 s to a Vickers diamond at a force of up to 3 mN, and the penetration depth is measured. Accordingly the hardness at room temperature is at least 0.01 N/mm$^2$, preferably at least 0.1 N/mm$^2$ and very preferably at least 1 N/mm$^2$, but this should not be taken to constitute a restriction. Thereafter the force is held constant at 3 mN for 5 s and the creep is calculated from the penetration depth. In preferred membranes the creep $C_{HU}$ 0.003/20/5 under these conditions is less than 20%, preferably less than 10% and very preferably less than 5%. The modulus YHU determined by microhardness measurement is at least 0.5 MPa, in particular at least 5 MPa and very preferably at least 10 MPa, but this should not be taken to constitute any restriction.

Depending on the desired degree of polymerization the sheetlike structure obtained after the polymerization is a self-supporting membrane. The degree of polymerization is preferably at least 2, in particular at least 5, very preferably at least 30 repeating units, in particular at least 50 repeating units, with very particular preference at least 100 repeating units. This degree of polymerization is determined from the numerical average of the molecular weight $M_n$, which can be determined by GPC methods. Owing to the problems of isolating the polyvinylsulfonic acid present in the membrane without causing degradation, this value is determined from a sample which is carried out by polymerizing vinyl-containing sulfonic acid and, where used, vinyl-containing phosphonic acid without solvent and without addition of polymer. In this case the weight fraction of vinyl-containing sulfonic acid and, where used, vinyl-containing phosphonic acid and of free-radical initiator is kept constant in comparison to the conditions after dissolution of the membrane. The conversion which is obtained in a comparative polymerization is preferably greater than or equal to 20%, in particular greater than or equal to 40% and very preferably greater than or equal to 75%, based on the vinyl-containing sulfonic acid and, where appropriate, vinyl-containing phosphonic acid employed.

The polymerization in step D) can lead to a decrease in the layer thickness. The thickness of the self-supporting membrane is preferably between 15 and 1000 μm, more preferably between 20 and 500 μm, in particular between 30 and 250 μm.

The membrane obtained according to step D) is preferably self-supporting; that is, it can be detached from the support without damage and subsequently can be processed further directly if desired.

Following the polymerization according to step D) the membrane can be crosslinked at the surface thermally, photochemically, chemically and/or electrochemically. This curing of the membrane surface further improves the properties of the membrane.

According to one particular aspect the membrane can be heated to a temperature of at least 150° C., preferably at least 200° C. and very preferably at least 250° C. Thermal crosslinking preferably takes place in the presence of oxygen. The oxygen concentration during this process step is usually in the range from 5 to 50% by volume, preferably from 10 to 40% by volume, but this should not be taken to constitute any restriction.

Crosslinking may also take place by exposure to IR or NIR (IR=infrared, i.e., light having a wavelength of more than 700 nm; NIR=near IR, i.e., light having a wavelength in the range from about 700 to 2000 nm or an energy in the range from about 0.6 to 1.75 eV) and/or UV light. A further method is to carry out irradiation with β, γ and/or electron beams. The radiation dose in this case is preferably between 5 and 200 kGy, in particular 10 to 100 kGy. Irradiation may take place in air or under inert gas. This enhances the service properties of the membrane, in particular its durability.

The duration of the crosslinking reaction may range widely depending on the desired degree of crosslinking. In general this reaction time is in the range from 1 second to 10 hours, preferably from 1 minute to 1 hour, but this should not be taken to constitute any restriction.

According to one particular embodiment of the present invention the membrane contains at least 3%, preferably at least 5% and more preferably at least 7% by weight of phosphorus (as the element), based on the total weight of the membrane. The phosphorus fraction can be determined by way of an elemental analysis. For this purpose the membrane is dried at 110° C. for 3 hours under vacuum (1 mbar).

The polymer membrane of the invention features improved material properties as compared with the doped polymer membranes known today. In particular, in comparison with known undoped polymer membranes, they already feature an intrinsic conductivity. This is substantiated in particular by existing polymers containing sulfonic acid and phosphonic acid groups.

The intrinsic conductivity of the membrane of the invention is at least 0.001 S/cm, preferably at least 10 mS/cm, in particular at least 20 mS/cm at a temperature of 70° C. In order to obtain these values a membrane of the invention can be moistened. For this purpose, for example, the compound used as energy source, hydrogen or methanol for example, can be provided with a fraction of water. In many cases, however, the water formed by the reaction is enough to provide these conductivity values.

With a weight fraction of polyvinylphosphonic acid of more than 10%, based on the total weight of the membrane, the membranes generally exhibit a conductivity at temperatures of 160° C. of at least 1 mS/cm, preferably at least 3 mS/cm, in particular at least 5 mS/cm and very preferably at least 10 mS/cm. These values are achieved without moistening.

The specific conductivity is measured by means of impedance spectroscopy in a 4-pole arrangement in potentiostatic mode using platinum electrodes (wire, 0.25 mm diameter). The distance between the current-collecting electrodes is 2 cm. The spectrum obtained is evaluated using a simple model made up of a parallel arrangement of an ohmic resistor and a capacitor. The sample cross section of the phosphoric-acid-doped membrane is measured immediately prior to assembly of the sample. To measure the temperature dependency the measuring cell is brought to the desired temperature in an oven and is regulated by way of a Pt-100 thermo-couple positioned in the immediate vicinity of the sample. After the temperature has been reached the sample is held at that temperature for 10 minutes before measurement is commenced.

The crossover current density in operation with 0.5 M methanol solution at 90° C. in a liquid direct methanol fuel cell is preferably less than 100 mA/cm$^2$, in particular less than 70 mA/cm$^2$, more preferably less than 50 mA/cm$^2$ and very preferably less than 10 mA/cm$^2$. The crossover current density in operation with a 2 M methanol solution at 160° C. in a gaseous direct methanol fuel cell is preferably less than 100 mA/cm$^2$, in particular less than 50 mA/cm$^2$, very preferably less than 10 mA/cm$^2$.

To determine the crossover current density the amount of carbon dioxide released at the cathode is measured using a $CO_2$ sensor. The resulting figure for the quantity of $CO_2$ is used to calculate the crossover current density as described by P. Zelenay, S. C. Thomas, S. Goftesfeld in S. Gottesfeld, T. F. Fuller "Proton Conducting Membrane Fuel Cells II" ECS Proc. Vol. 98-27 pp. 300-308.

Possible fields of use for the intrinsically conductive polymer membranes of the invention include their use in fuel cells, in electrolysis, in capacitors and in battery systems. In view of their profile of properties the polymer membranes can be used with preference in fuel cells, in particular in DMFC fuel cells (direct methanol fuel cell).

The present invention also provides a membrane electrode assembly comprising at least one polymer membrane of the invention. The membrane electrode assembly has a high performance capability even when the amount of catalytically active substances, such as platinum, ruthenium or palladium, for example, is low. For this purpose it is possible to use gas diffusion layers provided with a catalytically active coat.

The gas diffusion layer generally displays electron conductivity. Normally use is made for this purpose of sheetlike structures which are electrically conducting and acid-resistant. Such structures include, for example, carbon fiber papers, graphitized carbon fiber papers, carbon fiber fabrics, graphitized carbon fiber fabrics and/or sheetlike structures which have been made conductive by adding carbon black.

The catalytically active coat comprises a catalytically active substance. Such substances include noble metals, especially platinum, palladium, rhodium, iridium and/or ruthenium. These substances can also be used in the form of alloys with one another. Furthermore, these substances can be used as alloys with non-noble metals, such as Cr, Zr, Ni, Co and/or Ti, for example. It is additionally possible to employ the oxides of the aforementioned noble metals and/or non-noble metals. According to one particular aspect of the present invention the catalytically active compounds are used in the form of particles with a size of preferably in the range from 1 to 1000 nm, in particular from 10 to 200 nm and preferably from 20 to 100 nm.

The catalytically active coat may further comprise customary additives. These include fluoropolymers such as polytetrafluoroethylene (PTFE), for example, and surface-active substances.

According to one particular embodiment of the present invention the weight ratio of fluoropolymer to catalyst material comprising at least one noble metal and, if desired, one or more support materials is greater than 0.1, this ratio being preferably in the range from 0.2 to 0.6.

According to one particular embodiment of the present invention the catalyst coat has a thickness in the range from 1 to 1000 μm, in particular from 5 to 500, preferably from 10 to 300 μm. This figure represents an average figure, which can be determined by measuring the coat thickness in the cross-section of micrographs obtainable using a scanning electron microscope (SEM).

According to one particular embodiment of the present invention the noble metal content of the catalyst coat is from 0.1 to 10.0 mg/cm$^2$, preferably from 0.2 to 6.0 mg/cm$^2$ and very preferably from 0.3 to 3.0 mg/cm$^2$. These figures can be determined by elemental analysis on a sheetlike sample.

For further information on membrane electrode assemblies, reference is made to the technical literature, particularly to patent applications WO 01/18894 A2, DE 195 09 748, DE 195 09 749, WO 00/26982, WO 92/15121 and DE 197 57 492. The disclosure in the aforementioned references relating to the construction and production of membrane electrode assemblies, and to the electrodes, gas diffusion layers and catalysts to be chosen, is also part of the description.

In another version a catalytically active coat can be applied to the membrane of the invention and this coat can be joined to a gas diffusion layer.

In one version of the present invention the membrane may be formed not on a support but directly on the electrode instead. As a result, the treatment according to step D) can be shortened accordingly or else the amount of initiator solution can be reduced, since it is no longer necessary for the membrane to be self-supporting. A membrane of this kind as well, and an electrode coated with such a polymer membrane of the invention, is provided by the present invention.

Furthermore it is also possible to carry out the polymerization of the vinyl-containing phosphonic acid and vinyl-containing sulfonic acid in the laminated membrane electrode assembly. For that purpose the solution is applied to the electrode, combined with the second electrode, which may be likewise coated, and compressed. Subsequently the polymerization is carried out as described above in the laminated membrane electrode assembly.

The coating has a thickness of between 2 and 500 μm, preferably between 5 and 300 μm, in particular between 10 and 200 μm. This allows its use in so-called micro-fuel cells, in particular in micro-DMFC fuel cells.

An electrode with a coating of this kind can be installed in a membrane electrode assembly which if desired comprises at least one polymer membrane of the invention.

In a further version, a catalytically active coat can be applied to the membrane of the invention and this coat can be joined to a gas diffusion layer. For that purpose a membrane is formed in accordance with steps A) to D) and the catalyst is applied. In one version the catalyst can be applied prior to or together with the initiator solution. These structures are also provided by the present invention.

Additionally the membrane can be formed according to steps A) to D) on a support or a support film which already comprises the catalyst. Following the removal of the support or support film, the catalyst is located on the membrane of the invention. These structures are also provided by the present invention.

Likewise provided by the present invention is a membrane electrode assembly comprising at least one coated electrode and/or at least one polymer membrane of the invention in combination with a further polymer membrane based on polyazoles or a polymer blend membrane comprising at least one polymer based on polyazoles.

The invention claimed is:

1. A proton-conducting polymer membrane comprising polymers containing sulfonic acid groups, prepared by a process comprising the steps of
   A) mixing (i) vinyl-containing sulfonic acid with (ii) one or more aromatic tetraamino compounds and with one or more aromatic carboxylic acids, their esters, their acid halides or their acid anhydrides said carboxylic acids, their esters, their acid halides or their acid anhydrides containing at least two carboxylic groups per carboxylic monomer, containing at least two acid groups per carboxylic acid monomer, or mixing (i) vinyl-containing sulfonic acid with (ii) one or more aromatic or heteroaromatic diaminocarboxylic acids, their esters, their acid halides or their acid anhydrides,
   B) heating the mixture prepared according to step a) under inert gas to temperatures of up to 350° C., to form polyazole polymers,
   C) applying a layer to a support, using the mixture according to step a) or step b),
   D) polymerizing the vinyl-containing sulfonic acid present in the sheetlike structure prepared according to step c).

2. The membrane of claim 1, characterized in that the aromatic tetraamino compounds are selected from 3,3',4,4'-tetraaaminobiphenyl, 2,3,5,6-tetraaminopyridine, 1,2,4,5-tetraaminobenzene, 3,3',4,4'-tetraaminodiphenyl sulfone, 3,3',4,4'-tetraaminodiphenyl ether, 3,3',4,4'-tetraaminobenzophenone, 3,3',4,4'-tetraaminodiphenyl methane and 3,3',4,4'-tetraaminodiphenyldimethyl methane.

3. The membrane of claim 1, characterized in that the aromatic carboxylic acids their esters, their acid halides or their acid anhydrides are selected from isolphthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-napthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, 2,2-bis(4-carboxyphenyl)hexafluoropropane, 4-4'-stilbenedicarboxylic acid, 4-carboxycinnamic acid, or their C1-C20 alkyl esters, their C5-C12 aryl esters, their acid anhydrides, or their acid chlorides.

4. The membrane of claim 1, characterized in that the aromatic carboxylic acid their esters, their acid halides or their acid anhydrides are selected from tricarboxylic acids, their C1-C20 alkyl esters, their C5-C12 aryl esters, their acid anhydrides, or their acid chlorides or tetracarboxylic acids, their C1-C20 alkyl esters, their C5-C12 aryl esters, their acid anhydrides or their acid chlorides.

5. The membrane of claim 4, characterized in that the aromatic carboxylic acid used includes at least one member of is selected from the group consisting of 1,3,5-benzenetricarboxylic acid (trimesic acid); 2,4,5-benzenetricarboxylic acid (trimellitic acid); (2-carboxyphenyl)iminodiacetic acid, 3,5,3'-biphenyl-tricarboxylic acid; 3,5,4'-biphenyltricarboxylic acid; 2,4,6-pyridinetricarboxylic acid; benzene-1,2,4,5-tetracarboxylic acids; naphthalene-1,4,5,8-tetracarboxylic acids; 3,5,3',5'-biphenyltetracarboxylic acids; benzophenonetetracarboxylic acid; 3,3',4,4'-biphenyltetracarboxylic acid; 2,2',3,3'-biphenyltetracarboxylic acid; 1,2,5,6-naphthalenetetracarboxylic acid; and 1,4,5,8-napththalenetetracarboxylic acid.

6. The membrane of claim 4, characterized in that the amount of tricarboxylic acid or tetracarboxylic acids is between 0 an 30 mol % based on dicarboxylic acid used.

7. The membrane of claim 1, characterized in that the heteroaromatic carboxylic acids, heteroaromatic dicarboxylic acids, heteroaromatic tricarboxylic acids, or heteroaromatic tetracarboxylic acids contain at least one nitrogen, oxygen, sulfur, or phosphorus atoms in the aromatic moiety.

8. The membrane of claim 7 characterized in that said carboxylic acids, their esters, their acid halides or their acid anhydrides are selected from pyridine-2,5-di-carboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6 pyrimidinedicarboxylic acid, 2,5-pyrazine-dicarboxylic acid, 2,4,6-pyridinetricarboxylic acid, benzimidazole-5,6- di-carboxylic acid, and their C1-C20 alkyl esters, their C5-C12 aryl esters, their acid anhydrides, or their acid chlorides.

9. The membrane of claim 1, characterized in that said carboxylic acids, their esters, their acid halides or their acid anhydrides are selected from aromatic diaminocarboxylic acid, diaminobenzoic acid, or the mono- and dihydrochloride derivatives thereof.

10. The membrane of claim 1, characterized in that the mixture prepared in step A) comprises compounds of the formula

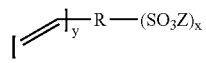

in which
R is a bond, a C1-C15 alkyl group, C1-C15 alkoxy group, ethyleneoxy group or C5-C20 aryl or heteroaryl group, wherein the above radicals are optionally substituted by halogen, —OH, COOZ, —CN, or $N(Z)_2$,
Z independently at each occurrence is hydrogen, C1-C15 alkyl group, C1-C15 alkoxy group, ethyleneoxy group or C5-C20 aryl or heteroaryl group, wherein the above radicals are optionally substituted by halogen, —OH, or —CN, and
x is an integer 1, 2, 3, 4, 5, 6, 7, 8, 9 or 10,
y is an integer 1, 2, 3, 4, 5, 6, 7, 8, 9 or 10
or the formula

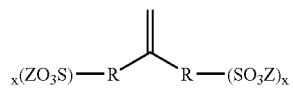

in which
R is a bond, a C1-C15 alkyl group, C1-C15 alkoxy group, ethyleneoxy group or C5-C20 aryl or heteroaryl group, wherein the above radicals are optionally substituted by halogen, —OH, COOZ, —CN, or $N(Z)_2$,
Z independently at each occurrence is hydrogen, C1-C15 alkyl group, C1-C15 alkoxy group, ethyleneoxy group, or C5-C20 aryl or heteroaryl group, wherein the above radicals are optionally substituted by halogen, —OH, or —CN, and
x is an integer 1, 2, 3, 4, 5, 6, 7, 8, 9 or 10,
or the formula

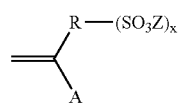

in which
A is a group of the formulae $COOR^2$, CN, $CONR^2_2$, $OR^2$ or $R^2$, in which $R^2$ is hydrogen, a C1-C15 alkyl group, C1-C15-alkoxy group, ethyleneoxy group or C5-C20 aryl or heteroaryl group, wherein the above radicals are optionally substituted by halogen, —OH, COOZ, —CN, or $N(Z)_2$,
R is a bond, a divalent C1-C15 alkylene group, divalent C1-C15 alkyleneoxy group, such a divalent ethyleneoxy group or C5-C20 aryl or heteroaryl group,
wherein the above radicals are optionally substituted by halogen, —OH, COOZ, —CN, or $N(Z)_2$,
Z independently at each occurrence is hydrogen, C1-C15 alkyl group, C1-C15 alkoxy group, ethyleneoxy group or C5-C20 aryl or heteroaryl group, wherein the above radicals are optionally substituted by halogen, —OH, or —CN, and
x is an integer 1, 2, 3, 4, 5, 6, 7, 8, 9 or 10.

11. The membrane of claim 1, characterized in that the mixture prepared in step A) or step B) further comprises vinyl-containing phosphonic acid.

12. The membrane of claim 11, characterized in that the mixture prepared in step A) or step B) comprises compounds of the formula

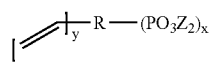

in which
R is a bond, a C1-C15 alkyl group, C1-C15 alkoxy group, ethyleneoxy group or C5-C20 aryl or heteroaryl group, wherein the above radicals are optionally substituted in turn by halogen, —OH, COOZ, —CN, $NZ_2$,
Z independently at each occurrence is hydrogen, C1-C15 alkyl group, C1-C15 alkoxy group, ethyleneoxy group or C5-C20 aryl or heteroaryl group, wherein the above radicals are optionally substituted in turn by halogen, —OH, —CN and
x is an integer 1, 2, 3, 4, 5, 6, 7, 8, 9 or 10,
y is an integer 1, 2, 3, 4, 5, 6, 7, 8, 9 or 10
or of the formula

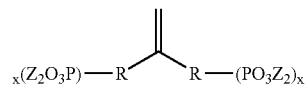

in which
R is a bond, a C1-C15 alkyl group, C1-C15 alkoxy group, ethyleneoxy group or C5-C20 aryl or heteroaryl group, wherein the above radicals are optionally substituted by halogen, —OH, COOZ, —CN, or $N(Z)_2$,
Z independently at each occurrence is hydrogen, C1-C15 alkyl group, C1-C15 alkoxy group, ethyleneoxy group or C5-C20 aryl or heteroaryl group, wherein the above radicals are optionally substituted by halogen, —OH, —CN, and
x is an integer 1, 2, 3, 4, 5, 6, 7, 8, 9 or 10,
or of the formula

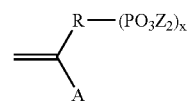

in which
A is a group of the formulae $COOR^2$, CN, $CONR^2_2$, $OR^2$ or $R^2$, in which $R^2$ is hydrogen, a C1-C15 alkyl group, C1-C15-alkoxy group, ethyleneoxy group or C5-C20 aryl or heteroaryl group, wherein the above radicals are optionally substituted by halogen, —OH, COOZ, —CN, or $N(Z)_2$, R is a bond, a divalent C1-C15 alkylene group, divalent C1-C15 alkyleneoxy group, such as ethyleneoxy group or divalent C5-C20 aryl or heteroaryl group, wherein the above radicals are optionally substituted by halogen, —OH, COOZ, —CN, or N(Z)$_2$, Z independently at each occurrence is hydrogen, C1-C15 alkyl group, C1-C15 alkoxy group, ethyleneoxy group or C5-C20 aryl or heteroaryl group, wherein the above radicals are optionally substituted by halogen, —OH, CN, and x is an integer 1, 2, 3, 4, 5, 6, 7, 8, 9 or 10.

13. The membrane of claim 10, characterized in that the weight ratio of vinyl-containing phosphonic acid to vinyl-containing sulfonic acid is in the range from 1:100 to 99:1.

14. The membrane of claim 1, characterized in that in step D) monomers capable of crosslinking which contain at least two carbon-carbon double bonds are polymerized.

15. The membrane of claim 1, characterized in that the polymerization according to step D) is brought about by means of a free radical initiator.

16. The membrane of claim 1, characterized in that the polymerization according to step D) takes place by irradiation of IR or NIR light, UV light, β, γ or electron beams.

17. The membrane of claim 1, characterized in that the mixture produced in step A) or step B) comprises dissolved, dispersed or suspended polymer.

18. The membrane of claim 1, characterized in that in step C) a layer having a thickness between 20 and 4000 µm is produced.

19. The membrane of claim 1, characterized in that the membrane formed after step D) has a thickness of between 15 and 3000 µm.

20. An electrode having a proton-conducting polymer coating based on polyazoles prepared by a process comprising the steps of
   A) mixing (i) a vinyl-containing sulfonic acid with (ii) one or more aromatic tetraamino compounds and with one or more aromatic carboxylic acids, their esters, their acid halides or their acid anhydrides, said carboxylic acids, their esters, their acid halides or their acid anhydrides containing at least two carboxylic groups per carboxylic monomer, or mixing (i) a vinyl-containing sulfonic acid with (ii) one or more aromatic or heteroaromatic diaminocarboxylic acids, their esters, their acid halides or their acid anhydrides,
   B) heating the mixture prepared according to step A) under inert gas to temperatures of up to 350° C., to form polyazole polymers,
   C) applying a layer to an electrode, using the mixture according to step A) or B), and
   D) polymerizing the vinyl-containing sulfonic acid.

21. The electrode of claim 20, wherein the coating has a thickness of carboxylic acids, their esters, their acid halides or their acid anhydrides, between 2 and 3000 µm.

22. The electrode of claim 21, wherein the coating has a thickness of between 5 and 1500 µm.

23. A membrane electrode assembly comprising at least one electrode and at least one membrane of claim 1.

24. A membrane electrode assembly comprising at least one electrode of claim 20 and at least one proton-conducting polymer membrane that includes polymers containing sulfonic acid groups and are prepared by a process comprising the steps of
   A) mixing (i) a vinyl-containing sulfonic acid with (ii) one or more aromatic tetraamino compounds and with one or more aromatic carboxylic acids, their esters, their acid halides or their acid anhydrides, said carboxylic acids, their esters, their acid halides or their acid anhydrides containing at least two carboxylic groups per carboxylic monomer, or mixing (i) a vinyl-containing sulfonic acid with (ii) one or more aromatic or heteroaromatic diaminocarboxylic acids, their esters, their acid halides or their acid anhydrides,
   B) heating the mixture prepared according to step a) under inert gas to temperatures of up to 350° C., to form polyazole polymers,
   C) applying a layer to a support, using the mixture according to step a) or step b),
   D) polymerizing the vinyl-containing sulfonic acid present in the sheetlike structure prepared according to step c).

25. A fuel cell comprising one or more membrane electrode assemblies of claim 23.

26. A process for producing proton-conducting polymer membranes comprising polymers containing sulfonic acid groups which comprises the steps of
   A) mixing (i) a vinyl-containing sulfonic acid with (ii) one or more aromatic tetraamino compounds and with one or more aromatic carboxylic acids, their esters, their acid halides or their acid anhydrides, said carboxylic acids, their esters, their acid halides or their acid anhydrides containing at least two carboxylic groups per carboxylic monomer, or mixing (i) a vinyl-containing sulfonic acid with (ii) one or more aromatic or heteroaromatic diaminocarboxylic acids, their esters, their acid halides or their acid anhydrides,
   B) heating the mixture prepared according to step A) under inert gas to temperatures of up to 350° C., to form polyazole polymers,
   C) applying a layer to a support, using the mixture according to step A) or B),
   D) polymerizing the vinyl-containing sulfonic acid.

27. The membrane of claim 11, wherein the mixture of polyazole polymers, polyvinyl sulfonic acid-containing polymers and polyvinyl phosphonic acid-containing polymers forms an interpenetrating network.

28. A proton-conducting polymer membrane comprising polymers containing sulfonic acid groups, prepared by a process comprising the steps of
   A) mixing (i) vinyl-containing sulfonic acid with (ii) one or more aromatic tetraamino compounds and with one or more aromatic carboxylic acids, their esters, their acid halides or their acid anhydrides, said carboxylic acids, their esters, their acid halides or their acid anhydrides containing at least two carboxylic groups per carboxylic group monomer, or mixing (i) vinyl-containing sulfonic acid with (ii) one or more aromatic or heteroaromatic diaminocarboxylic acids, their esters, their acid halides or their acid anhydrides,
   B) heating the mixture prepared according to step a) under inert gas to temperatures of up to 280° C., to form polyazole polymers,
   C) applying a layer to a support, using the mixture according to step A) or step B),
   D) polymerizing the vinyl-containing sulfonic acid present in the sheetlike structure prepared according to step C).

* * * * *

UNITED STATES PATENT AND TRADEMARK OFFICE
CERTIFICATE OF CORRECTION

PATENT NO. : 7,332,530 B2
APPLICATION NO. : 10/523373
DATED : February 19, 2008
INVENTOR(S) : Joachim Kiefer, Oemer Uensal and Gordon Calundann It is certified that error appears in the above-identified patent and that said Letters Patent is hereby corrected as shown below:

Column 27
Claim 1, lines 55-56, delete "monomer, containing at least two acid groups per carboxylic acid" and insert -- group --

Column 28
Claim 5, lines 40-41, delete "used includes at least one member of"

Column 29
Claim 9, line 6, delete "from aromatic" and insert -- from an aromatic --

Column 30
Claim 12, lines 24-25, deleted "substituted in turn by" and insert -- substituted by --.

Claim 12, line 29, delete "substituted in turn by" and insert -- substituted by --.

Claim 12, lines 49-50, delete "-OH, -CN" and insert -- -OH, or -CN --.

Column 31
Claim 12, lines 9-10, delete "-OH, -CN" and insert -- -OH, or -CN --

Claim 21, lines 53-54, delete "of carboxylic acids, their esters, their acid halides or their acid anhydrides, between" and insert -- of between --

UNITED STATES PATENT AND TRADEMARK OFFICE
CERTIFICATE OF CORRECTION

PATENT NO. : 7,332,530 B2
APPLICATION NO. : 10/523373
DATED : February 19, 2008
INVENTOR(S) : Joachim Kiefer, Oemer Uensal and Gordon Calundann It is certified that error appears in the above-identified patent and that said Letters Patent is hereby corrected as shown below:

<u>Column 32</u>
Claim 26, line 33, delete "350° C.," and insert -- 350° C, --

Claim 28, line 57, delete "280° C.," and insert -- 280° C, --

Signed and Sealed this

Twenty-first Day of October, 2008

JON W. DUDAS
*Director of the United States Patent and Trademark Office*